Jan. 31, 1933.   A. B. MERRILL   1,895,936
RUBBER SHAFT BEARING
Filed Oct. 31, 1928
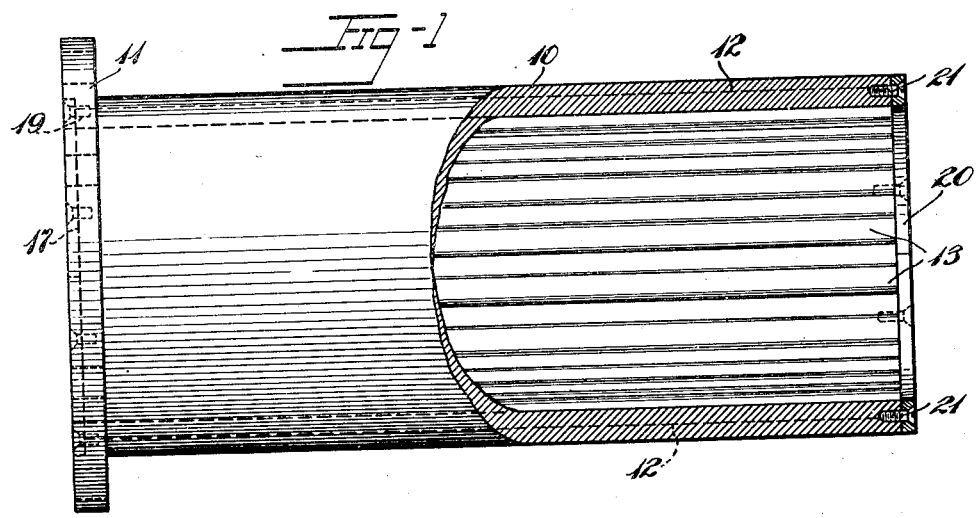
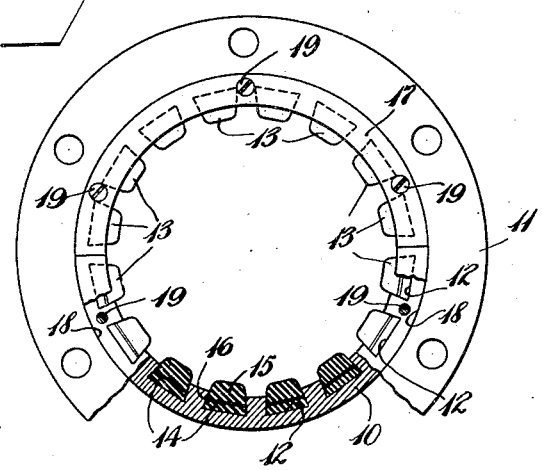
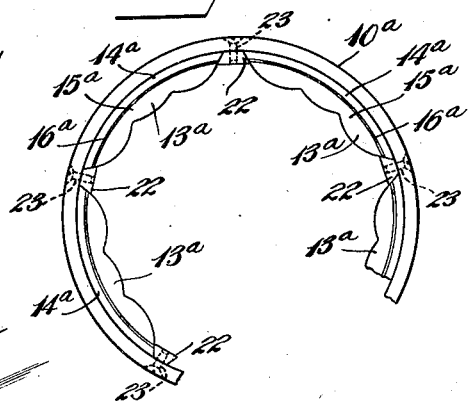
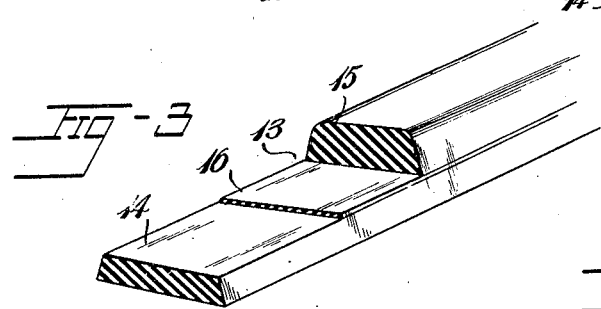
Inventor
Allan B. Merrill
By Eakin & Avery
Attys.

Patented Jan. 31, 1933

1,895,936

UNITED STATES PATENT OFFICE

ALLAN B. MERRILL, OF AKRON, OHIO, ASSIGNOR TO THE B. F. GOODRICH COMPANY, OF NEW YORK, N. Y., A CORPORATION OF NEW YORK

RUBBER SHAFT-BEARING

Application filed October 31, 1928. Serial No. 316,271.

This invention relates to rubber shaft-bearings and especially to rubber bearings of the type comprising a plurality of bearing sections of rubber composition positioned between a shaft and a housing structure and adapted for water lubrication.

The chief objects of the invention are to provide simplicity of design, economy of manufacture, and ease of replacing damaged or worn sections. I aim to eliminate the use of metal in the bearing sections as a means for securing them in the bearing structure, and thus to avoid fusion of the metal portions of the sections with their supporting structure such as would occur in the presence of corrosive fluids such as sea water, for example.

Of the accompanying drawing:

Fig. 1 is a side elevation of a bearing embodying my invention in its preferred form, a part being broken away and in section.

Fig. 2 is an end elevation of the same, as viewed from the left of Fig. 1 a part being broken away and parts in section.

Fig. 3 is a fragmentary sectional perspective view of one of the bearing sections.

Fig. 4 is an end elevation of a modified form of my invention.

Referring to the drawing, 10 is a tubular sleeve or shell, usually of metal and preferably of brass or bronze composition, and 11 is an external circumferential flange formed on one end thereof. The inner face of the shell 10 is formed with a circumferential series of longitudinally disposed undercut grooves 12, 12, and mounted in said grooves are respective bearing sections 13, 13.

Each bearing section 13 comprises a base portion 14 of hard rubber composition, a bearing portion 15 of resilient, soft-rubber composition, and a relatively thin layer of "tie gum" or other suitable adhesive 16 interposed between the layers of hard and soft rubber compositions to bind them firmly together, the respective portions of the section being vulcanized together and concurrently molded to form a unitary structure. The configuration of the sections 13 is complemental to the grooves 12 so that they may be fitted snugly therein by sliding them lengthwise into the grooves and yet are easily removed therefrom for repairs or replacement. The depth of the grooves 12 is such that the base portion and "tie gum" of each section is entirely within the groove below the inner face of the shell, so that only the resilient bearing portion of the section is exposed. The bearing face of the section preferably is flat or convex so that it engages a shaft tangentially, forming an acute angle with the surface of the shaft. Preferably the grooves 12 are laterally spaced from each other a sufficient distance to provide, in the assembled bearing, lubricant channels of substantial width between the respective bearing sections 13.

The bearing sections 13 are restrained against longitudinal movement in the grooves 12 by a two-part washer 17 inset in a counterbore 18 formed in the end face of the flanged end of the shell 10 and secured therein by screws 19, 19 or by any other suitable means, and by a similar washer 20 secured to the opposite end of the shell by screws 21, 21.

Being composed entirely of moldable composition, the bearing sections may be made complete by simple and economical molding methods. The bearing sections will not corrode and adhere strongly to the metal parts of the bearing structure, which would result in difficulty in their removal. Extreme accuracy in the size and shape of the bearing sections is not required, since the base portions of the sections may be softened by heat and the forcing of the sections into interfitted relation with the grooves 12 thus facilitated.

In the modified form of my invention shown in Fig. 4, 10ª is a tubular sleeve or shell and 13ª, 13ª are a plurality of transversely arcuate bearing sections mounted upon the inner wall thereof. The bearing sections may be wider than the bearing sections 13, and may be formed with a plurality of longitudinal flutes or ribs as shown, to provide a plurality of bearing surfaces on each section, with lubricant channels between the flutes, in addition to lubricant channels between adjacent bearing sections.

Each bearing section 13ª is of a construction similar to that of the sections 13, having a base portion 14ª of hard rubber composition, a bearing portion 15ª of resilient, soft rubber composition, and a tie-strip 16ª interposed between said portions and united therewith.

The lateral marginal portions of the bearing sections 13ª are tapered toward their edges as shown and the sections are retained in the shell 10ª by retaining strips or cleats 22, 22, which may be of metal or of hard rubber composition. The strips 22 are trapezoidal in cross-section, being complemental to the marginal configuration of the sections 13ª, and are adapted to overlie the marginal portions of adjacent sections when the latter are assembled in the shell 10ª. The strips 22 are secured in place by screws 23, 23 which pass through the shell 10ª from the outer face thereof.

My invention is susceptible of modification within the scope of the appended claims.

I claim:

1. A shaft-bearing comprising a rigid sleeve and a circumferential series of bearing sections mounted therein, each section comprising a base portion of hard rubber composition deformable under heat and pressure detachably locked against displacement in direct contact with the inner face of the sleeve and a bearing-surface portion of soft-rubber composition shaped to form an acute angle with the surface of the shaft, said sections having their shaft-contacting surfaces spaced apart circumferentially of the bearing to provide lubricating channels.

2. A shaft-bearing as defined in claim 1 in which the sleeve is formed with undercut longitudinal grooves and the base portions of the bearing sections are complementarily formed and mounted in said grooves.

3. A shaft-bearing comprising a metal sleeve and mounted out of contact with each other on the inner face thereof a circumferential series of deformable individual detachable molded strips of hard rubber having shaft-contacting portions of soft rubber shaped to form acute angles with the surface of the shaft.

4. A shaft bearing comprising a rigid sleeve member formed to provide spaced longitudinal undercut grooves in its face, and a series of non-metallic bearing members of corrosion-resistant molded material individually and detachably locked in said grooves and extending thereabove to provide spaced shaft contacting portions, each of said members comprising a rigid hard rubber groove-engaging portion located entirely within the groove and integrally attached thereto a soft rubber shaft contacting portion having a contacting surface which meets the shaft at an acute angle.

5. A shaft bearing comprising a rigid support for bearing sections, and bearing sections each integrally molded to its final shape with a relatively hard non-metallic deformable base portion adapted to engage the support and a bearing-surface portion of soft rubber composition shaped to form an acute angle with the surface of the shaft, the said base portion of each section being detachably held against the said support in direct contact with the same against displacement, said sections having their shaft-contacting surfaces spaced apart circumferentially of the bearing to provide lubricating channels.

6. A shaft bearing as defined in claim 5 in which each bearing section is composed of rubber compositions of different degrees of hardness.

In witness whereof I have hereunto set my hand this 8th day of October, 1928.

ALLAN B. MERRILL.